United States Patent [19]

May et al.

[11] 4,344,523

[45] Aug. 17, 1982

[54] APPARATUS FOR ACCUMULATING AND STACKING ARTICLES

[75] Inventors: Kenneth D. May, Buffalo Grove; John T. Bell, St. Charles, both of Ill.

[73] Assignee: Container Corporation of America, Chicago, Ill.

[21] Appl. No.: 139,853

[22] Filed: Apr. 14, 1980

[51] Int. Cl.³ .............................................. B65G 47/26
[52] U.S. Cl. ...................................... 198/424; 53/148;
53/251; 53/534; 53/537; 53/543; 198/426;
198/646; 414/47; 414/68
[58] Field of Search ............... 198/422, 424, 426, 419, 198/646–647; 414/47, 57, 68; 53/148, 251, 534, 537, 543; 271/9, 271

[56]  References Cited

U.S. PATENT DOCUMENTS 2,442,102  5/1948  Tenety ................................. 198/426
4,018,324  4/1977  Kamphues ....................... 198/419 X

FOREIGN PATENT DOCUMENTS 1223172  2/1971  United Kingdom ................ 198/419

Primary Examiner—Robert B. Reeves
Assistant Examiner—Douglas D. Watts
Attorney, Agent, or Firm—Richard W. Carpenter; Davis Chin

[57]  ABSTRACT

Apparatus for accumulating and stacking articles, such as sausages or other food products, in cylindrical shaped casings, includes a conveyor moving the articles in groups to positions where portions of the group are removed by a conveyor to positions from which they are further moved into a conveyor having carriages receiving a group portion as a lower tier of a stack thereof and subsequently receiving another group portion as an upper tier.

3 Claims, 24 Drawing Figures

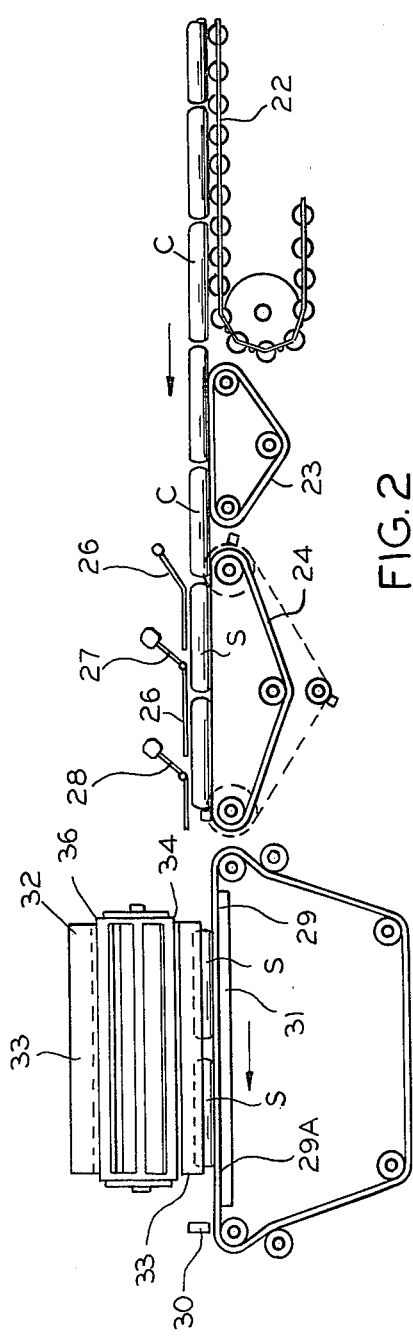
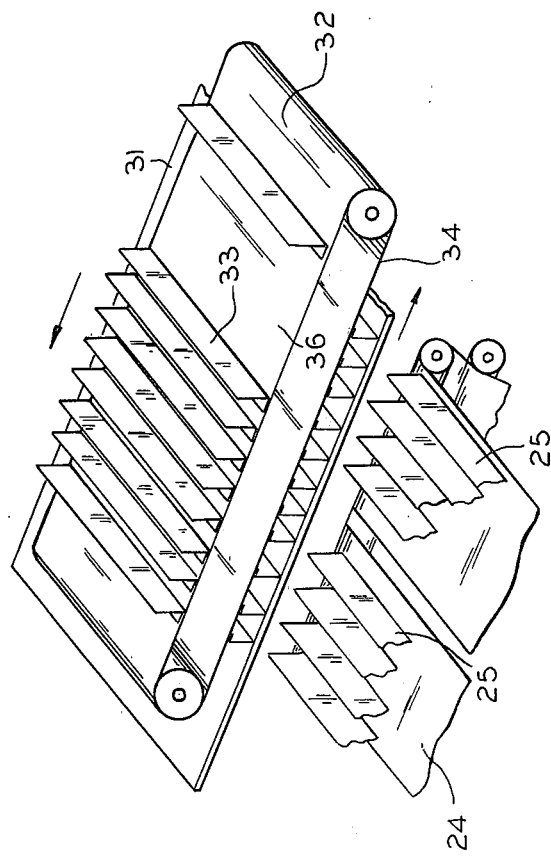
FIG.2
FIG.3

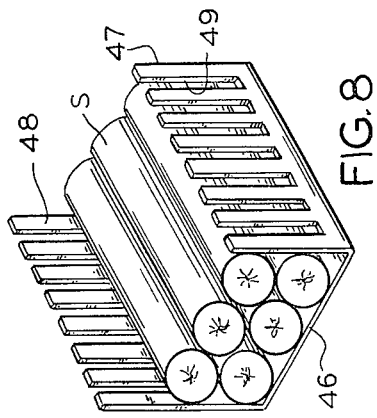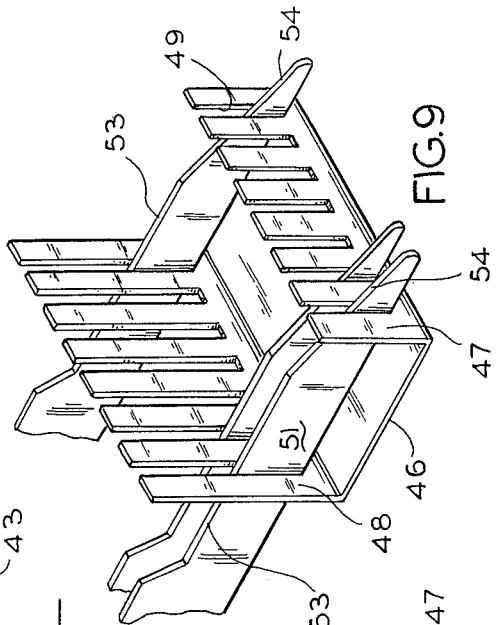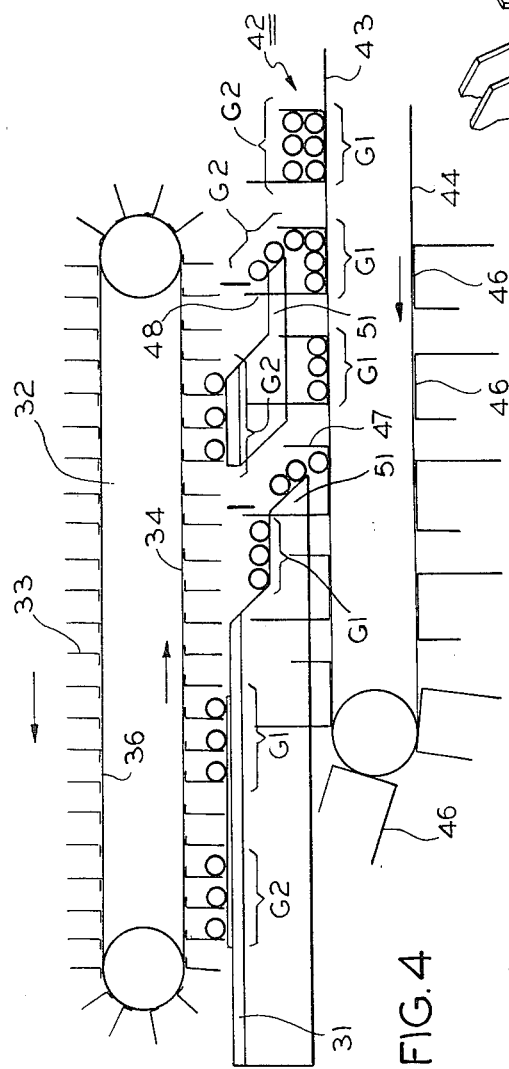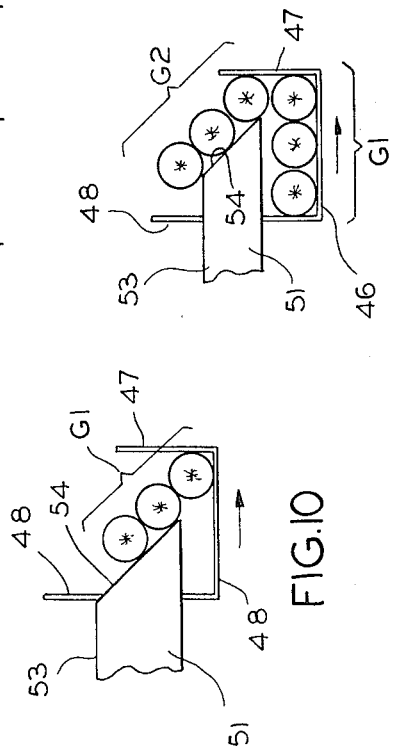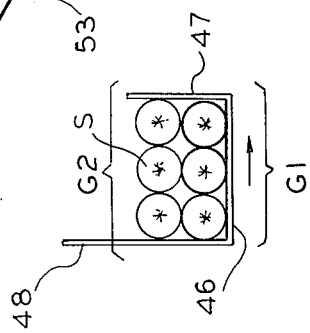

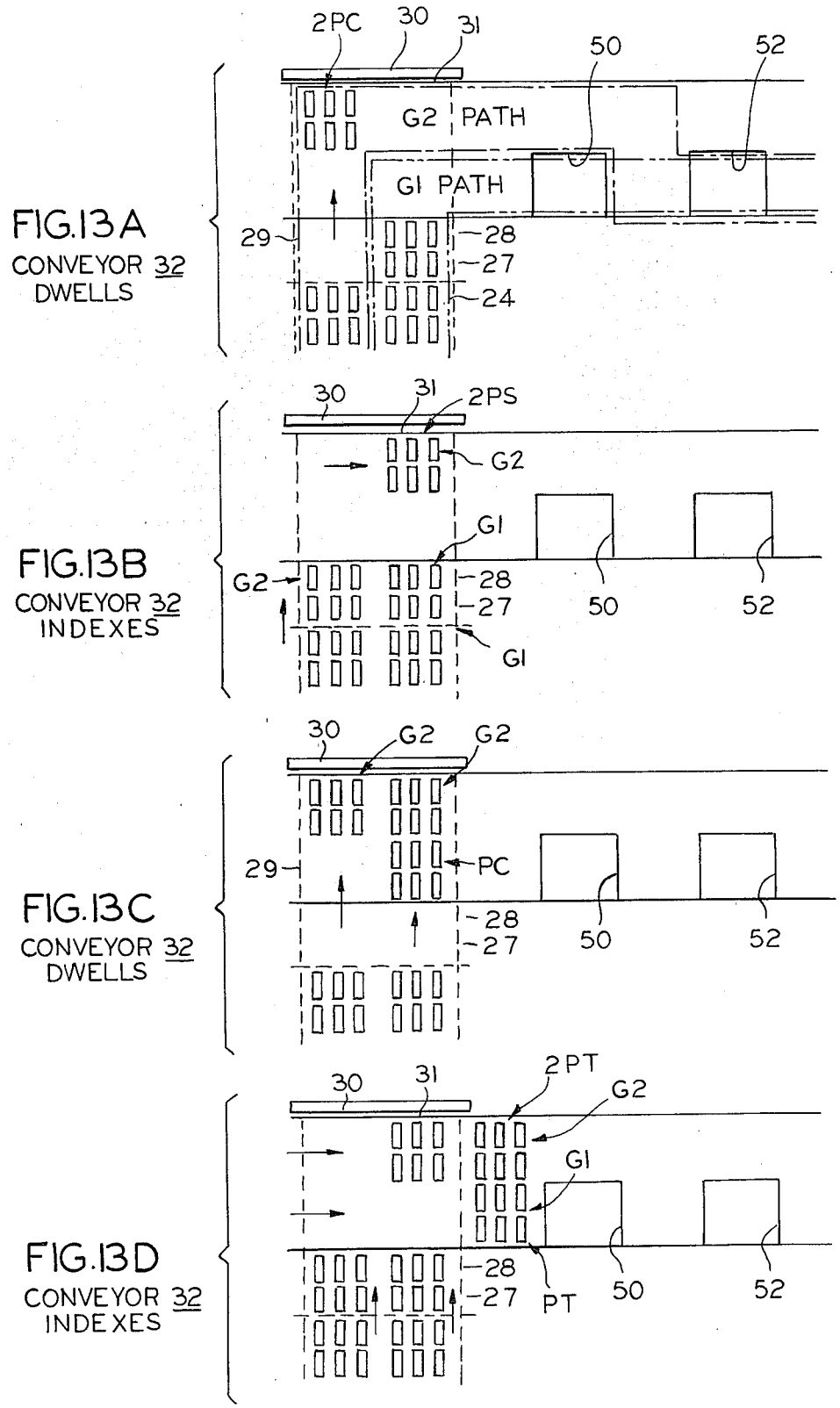

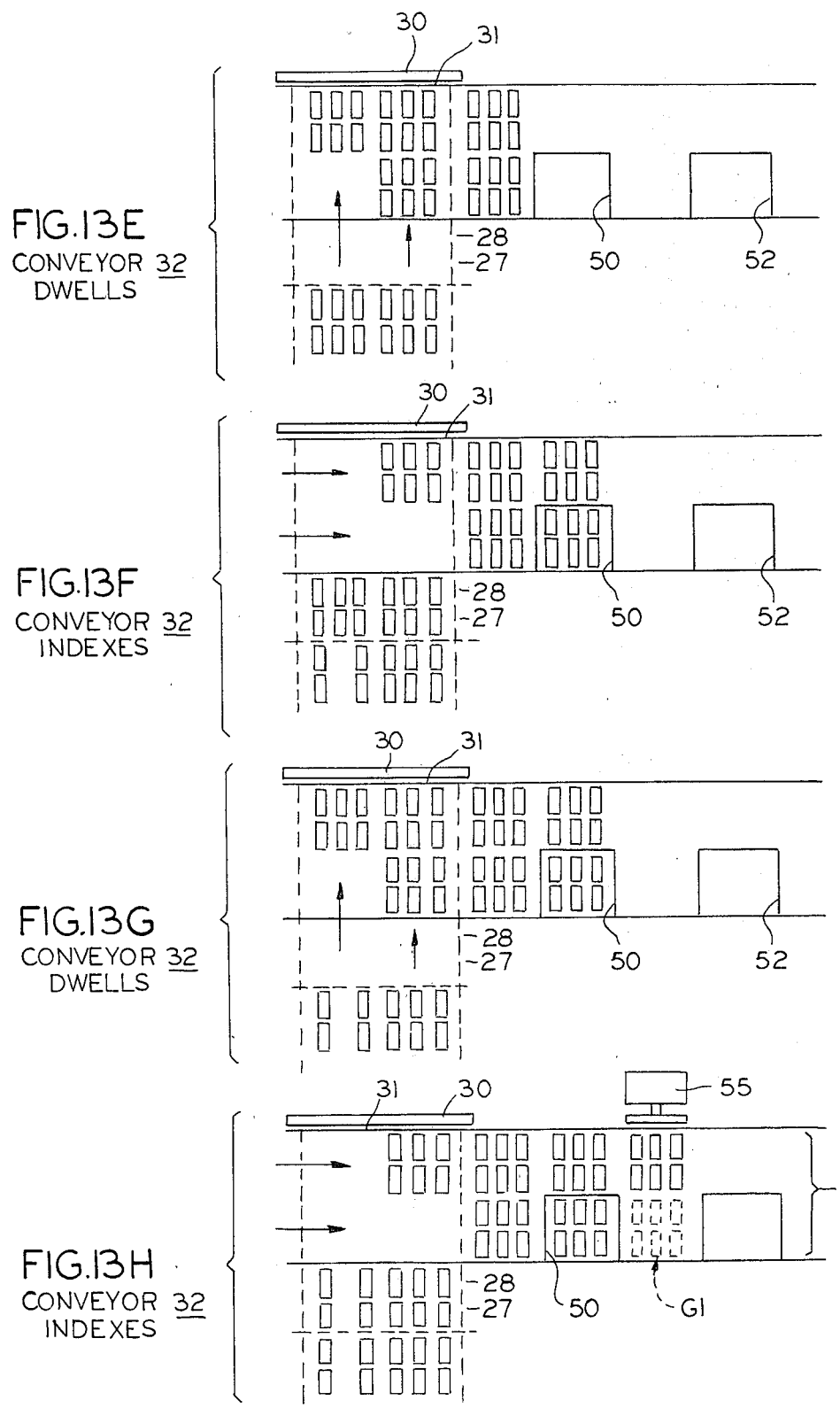

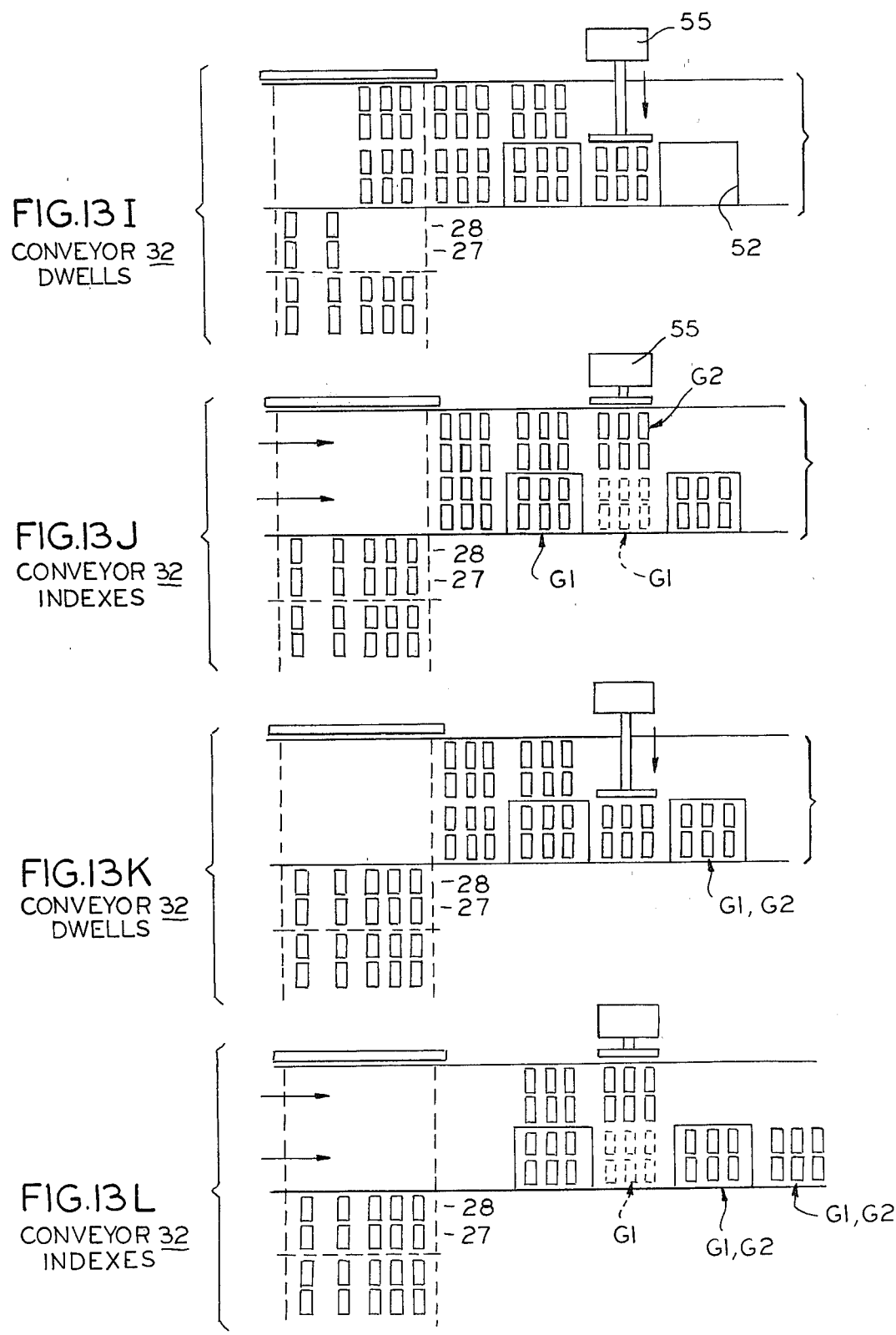

APPARATUS FOR ACCUMULATING AND STACKING ARTICLES

SUMMARY OF THE INVENTION

This invention is adapted for use with machines for packing food products known as "chubs" enclosed in cylindrical casings. By reason for their cylindrical cross section, they are difficult to arrange for final packaging in two or more stacks or tiers. In the usual case they are finally packed as two pound chubs of six, each tier having three chubs therein. Alternately, twelve chubs of one pound each are arranged in two tiers, each tier having six chubs of three rows with two chubs each.

In the embodiment shown herein, articles called chubs are moved in a number of side by side lanes. The articles in these lanes are divided into two groups of three to a group without disturbing their orientation as applied to the invention apparatus, and then are moved to positions where the groups are delivered to a moving conveyor having chub engaging flights. The groups are divided, one-half thereof being placed into a carrier as a lower tier of a stack, and the other half being placed into the carrier to form an upper tier of the stack. The carrier is then loaded with two tiers ready for delivery to a packaging machine.

The invention structure herein has a production rate equal to the rate at which stacked chubs may be packed into suitable wraparound containers. As far as is known, structures of the prior art were unable to supply product at a rate equal to the rate at which the stacked chubs could be packed into containers.

THE DRAWINGS

FIG. 2 is a schematic elevational view showing a certain conveyor mechanism;

FIG. 3 is an isometric view of a conveyor forming part of the present invention;

FIG. 4 is a schematic front elevational view of part of the invention structure seen in FIG. 1;

FIG. 5 is a schematic side elevational view of an infeed conveyor of the invention structure;

FIG. 6 is a schematic side elevational view of further details of the infeed conveyor;

FIG. 7 is an isometric view of part of a conveyor for receiving articles from the structure seen in FIGS. 1 to 6 inclusive;

FIG. 8 is a view similar to FIG. 7, showing the structure of FIG. 7 loaded with articles of a different size;

FIG. 9 is a view similar to FIGS. 7 and 8, showing structure for guiding the articles into the structures of FIGS. 7 and 8;

FIGS. 10, 11 and 12 show steps in the movement of the structures of FIGS. 7 and 8 in the placement of articles therein; and FIGS. 13A through 13L are schematic diagrams illustrating steps of operation of the apparatus to achieve loading into tiers.

THE SPECIFICATION

Figure 1:
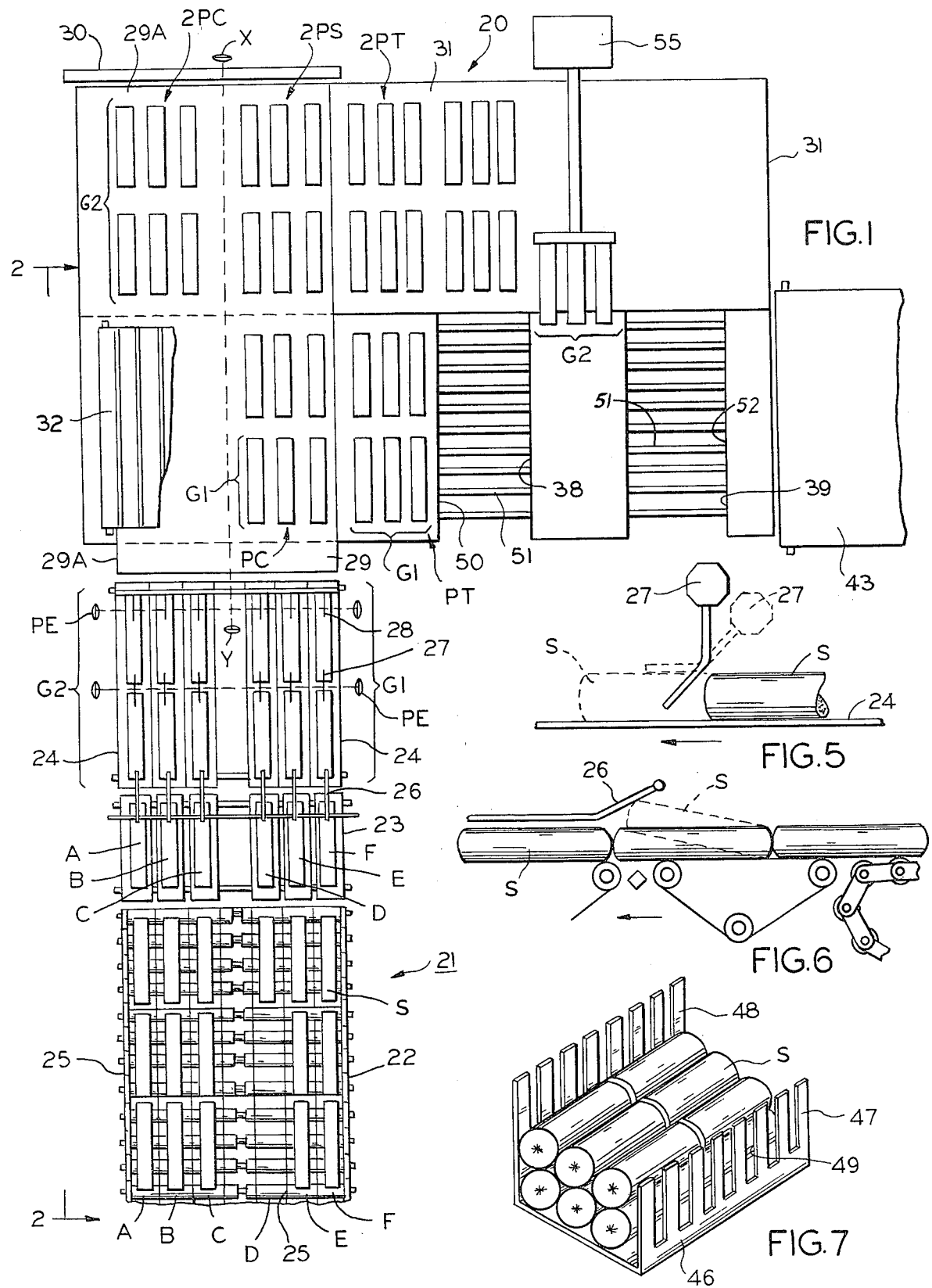
FIG. 1 is a schematic plan view of parts of the structure according to the present invention.

The structure according to the present invention is denoted generally by the reference numeral 20 and includes an infeed conveyor 21 for feeding articles such as sausage chubs S, the conveyor 21 including a roller flight conveyor portion 22, an intermediate endless conveyor 23 and an intermittently operating dual index feed conveyor 24. The conveyors are divided into six lanes by lane dividers 25, and the conveyor 21 may be part of the structure shown in a co-pending application, Ser. No. 125,491, filed Feb. 28, 1980, entitled "Conveyor System and Conveyor Apparatus Therefor" and assigned to the same Assignee of this application.

The chubs S on conveyor 22 and conveyor 23 are randomly dispersed in the lanes defined by the lane dividers 25, and the dual conveyor 24 is arranged to operate when the chubs S are closed on each other in end to end relationship. When in such relationship, and as will be described, the chub S are divided into groups for ultimate placement in tiers or stacks ready for packaging at a machine 30.

As seen with particular reference to FIGS. 2 and 5, the intermediate conveyor 23 feeds the chubs S past hold down members 26 on the dual indexing feed conveyor 24. It is provided with sensors 27 and 28, sensing the presence of the chub S in each lane, and when the sensors 27 and 28 including photo-electric cells PE in conjunction therewith are satisfied, lanes ABC of dual conveyor 24 index to advance one group of six one pound chubs on to an endless conveyor 29 having a conveying reach 29A resting upon a support surface 31. A stop 30 is disposed at the downstream end of conveyor 29 to prevent unintended discharge of the chubs S therefrom. After the initial advance of one group, then both groups of chubs may be simultaneously advanced if continuous supplies exist in all six lanes A thru F.

As seen in FIG. 1, the groups of chubs S in lanes A to F advanced by dual conveyor 24, are divided into a group G1 from lanes D, E and F; and a group G2 from lanes A, B and C. Group G2 is advanced by the conveyor 29 to a first position 2PC thereon with respect to the support surface 31.

A third endless indexing conveyor 32, see FIG. 3, moving transversely with respect to conveyor 29, has flights 33 included in a lower conveying reach 34 and an upper return reach 36. Conveyor 32 indexes after conveyor 29 has completed its movement of Group G2 to position 2PC to place the Group G2 chubs in position 2PS.

The next indexing of conveyor 24, if properly loaded with chubs S, as determined by the sensors 27 and 28 and cells PE, will advance a group of twelve chubs to conveyor 29. It advances the second Group G2 to position 2PC, and at the same time advances the first group G1 to the position PC, against the first Group G2, already in position 2PS.

Dual conveyor 24 moves six chubs in lanes A,B,C (Group G2), only if the sensors 27 and 28 at conveyor 24 including photoelectric means PE are satisfied, and moves six chubs in lanes D,E,F (Group G1) only if a photocell beam X-Y is broken by the indexing of previous Groups G2 from position 2PC to position 2PS. After such index movement by conveyor 24, the next index of chubs S by conveyor 32 will move chubs groups G1 and G2, each consisting of six, to positions 2PT and PT.

The sequence of steps, beginning with start up and the operations of the apparatus thus far described, are best seen in FIG. 13 which illustrates the operation.

FIG. 13 is divided into a number of small schematics denoted as 13 (A) to 13 (L). Reference will be made to these schematics by reference only to their letter designations for purposes of brevity herein. These schematics illustrate the steps performed by the invention apparatus in acting upon a supply of articles, properly dividing the same and ultimately moving the same to positions where they are stacked into tiers of a desired number in each tier.

The schematics (A) through (L) each bear legends corresponding to the apparatus thus far described and functions of such apparatus.

In (A) it will be noted that the chub groups G1 and G2 take separate paths. Initially dual conveyor 24 has moved chubs S in lanes A, B and C as group G2 to conveyor 29 to position 2PC against stop 30, conveyor 32 at this time being in dwell condition.

In (B), conveyor 32 has indexed to move group G2 to position 2PS on conveyor 29, still against stop 30. At this time lanes A, B and C of conveyor 24 are filled, and after conveyor 32 has ceased its cycle, conveyor 29 moves group G2 in lanes A, B and C and group G1 in lanes D, E and F.

Subsequently, as seen in (C), group G1 has moved against the previous group G2 at position 2PS. As seen in (D), conveyor 32 indexes to move G1 to position PT and group G2 to position 2PT.

As seen in (E), second group G2 has advanced to stop 30, since conveyor 29 operates continuously. Conveyor 32 at this time is in the dwell condition, and as seen in (F) conveyor 32 has indexed to move a group G2 to position 2PS on conveyor 29 against stop 30. The first of groups G1 is now at opening 50 in table 31. The first of groups G2 continue along table in the path for groups G2.

Continued dwell and indexing of conveyor 32 results in group G2 moving into position at a pusher 55 which indexes to move a group G2 from its group path to a position of alignment with the path of group G1. These movements are seen in (G) to (L) inclusive, conveyor 32 having indexed in (H) to move group G1 to opening 50 and in (K) to move group G2 to opening 52.

As seen in FIGS. (H) through (L) lanes A,B and C are not loaded with product S, so the sequence previously described does not obtain until all of such lanes are satisfied. However, all groups G1 and G2 continue their movement, the sequence described resumed when all the lanes are filled. The same applies also to lanes D,E and F.

As a result of the operations illustrated schematically in FIG. 13, the two side by side rows of groups of chubs G1 and G2 are so arranged that the chubs G1 are on one side of indexing conveyor 32, and chubs G2 on the other. They are arranged to move by the conveyor 32 in step-by-step fashion, chub groups G1 advancing to the opening 50 in support surface 31 where the group is directed to a structure for receiving the group of six to form a bottom tier. Chub groups G2 advance further along the support surface 31 until each group is directed into the opening 52 in support surface 31 where a group of six is received to form a second tier of the stack.

The structure for receiving chub groups G1 and G2 consists of an endless carrier conveyor means 42 having its conveying reach 43 extending below the support surface 31, as seen in FIG. 4. The endless conveyor 42 has an endless strand 44 supporting a plurality of evenly spaced carriers 46 thereon, and conveyor 42 is operated in timed relationship to the third indexing conveyor 32.

Each of the carriers 46 has a front wall 47 and a rear wall 48 spaced therefrom, each of the walls being provided with aligned slots 49, see FIGS. 8 to 12 inclusive. The height of the front wall 47 is less than that of the rear wall 48, so that when the groups G1 and G2 move through the openings 50 and 52 on to fixed rails or ramp members 51 extending below the support surface 31 and through the slots 49, the front wall 47 will pass beneath the rails 51, while the rear wall 48 will sweep group G1 or G2 from rails 51. The rails 51 have a holding surface for the chubs S, and a discharge surface or ramp 54 on which the chubs S move down to be placed as a tier in carrier 46. The chubs S move into carrier 46 by the sweep of the rear wall 48 therepast.

Each of the groups G2 is moved into opening 52, downstream with respect to group G1 by means of a pusher 55 operating in timed relationship to the conveyor 32, so that when a group G2 is aligned with group G1, it will be in position to move through opening 52 and onto rails 51. Upon movement to that point, a carrier 46 having the lower tier from the group G1 deposited therein will receive a second tier of chubs S, as best seen in FIGS. 7, 8 and 12.

It should be noted that the exemplary description thus far has been directed to the stacking of twelve one pound chubs, as seen in FIG. 7, arranged in two tiers of six chubs each. Alternately, the invention structure can be adjusted to stack six chubs of two pounds each. In the latter case, the chubs are fed to the apparatus as two pound chubs arranged in an end to end relationship, and each tier, as seen in FIG. 8, will have six chubs therein arranged in three rows of one chub each.

The circuitry for controlling the indexing of the various conveyors is not illustrated herein since such circuitry is well within the skill of the art.

We claim:

1. A conveyor for stacking articles in tiers comprising:
   (a) a conveying reach having spaced article conveying carriers movable therewith;
   (b) each of said carriers having a front wall and a rear wall, the front wall being shorter than the rear wall;
   (c) each of said walls having slots therein, the slots in the front wall being aligned with like slots in the rear wall;
   (d) stationary ramp members extending into said slots and providing support and guidance for a group of articles to be arranged in stacks in said carriers;
   (e) each ramp member having a holding surface for a group of articles while an adjacent group is moving along another surface for deposition of the articles into the carrier;
   (f) other ramp members disposed in a position in the direction of movement of the conveying reach and having a holding surface for a second group of articles positioned to be engaged by the rear wall of a carrier and to be deposited upon the articles already placed in said carrier.

2. A conveyor according to claim 1, wherein said ramp members are provided with a discharge surface for movement of a group as a tier.

3. An apparatus for accumulating and stacking articles comprising:
   infeed conveyor means having a plurality of lanes thereon for moving the articles in end-to-end relationship;
   first sensing means for sensing the presence of articles in said plurality of lanes of said infeed conveyor means;
   first endless conveyor means having a conveying reach disposed upon a support surface responsive to said first sensing means for receiving a portion of a group of said articles from said infeed conveyor means and for moving same in the end-to-end relationship to a first position on said first endless conveyor means;

second sensing means for sensing the presence of articles in said first position on said first endless conveyor means;

second endless conveyor means being responsive to said second sensing means and moving transversely to said infeed and first endless conveyor means, said second endless conveyor means having article engaging flights for moving the group portion to a second position on said first endless conveyor means, said second endless conveyor means being indexed to move said groups of articles to successive positions on said support surface;

said infeed and first endless conveyor means moving the remaining portion of the group of said articles to a position on said first endless conveyor means adjacent to the group portion for subsequent movement by said second conveyor means to a position on said first endless conveyor means spaced from the position adjacent said group portion on said first endless conveyor means;

endless carrier conveyor means being operable in a timed relation with respect to said second conveyor means, said endless carrier conveyor means being disposed beneath said support surface for receiving said remaining group portion from a position on said support surface and for subsequently receiving the group portion of said articles from a position on said support surface so that said articles are placed in said endless carrier conveyor means and stacked in tiers;

separating means disposed on said support surface including first openings to receive the groups for placement on said endless carrier means as a lower tier of the stack and second openings to receive the remaining groups for placement on said endless carrier means as an upper tier of the stack; and actuating means for moving the group portion into a position of alignment with said remaining group portion for subsequent movement into position of said second openings for placement on said endless carrier means.

* * * * *